Feb. 9, 1960

R. B. McINTOSH 2,924,766

HOIST LOAD SENSING DEVICE

Filed May 29, 1956

INVENTOR.
Robert B. McIntosh
BY
Hyde, Meyer, Baldwin & Doran
ATTORNEYS

INVENTOR.
Robert B. McIntosh
BY
Hyde, Meyer, Baldwin & Doran
ATTORNEYS

Feb. 9, 1960

R. B. McINTOSH 2,924,766

HOIST LOAD SENSING DEVICE

Filed May 29, 1956

INVENTOR.
Robert B. McIntosh
BY
Hyde, Meyer, Baldwin & Doran
ATTORNEYS

United States Patent Office 2,924,766
Patented Feb. 9, 1960

2,924,766

HOIST LOAD SENSING DEVICE

Robert B. McIntosh, Madison, Ohio, assignor, by mesne assignments, to The Euclid Crane & Hoist Company, Cleveland, Ohio, a corporation of Ohio Application May 29, 1956, Serial No. 588,074

19 Claims. (Cl. 318—302)

This invention relates to improvements in a motor control and more particularly to a load hoisting motor with a load sensing device.

One of the objects of the present invention is to provide a motor having control means for maintaining approximately constant motor load on the motor irrespective of the force exerted by the resisting load moved thereby, control means responsive to the movement resisting force exerted on the motor by the resisting load, control means for maintaining the speed of movement of the resisting load approximately constant irrespective of the resisting force, control means for changing the motor operating characteristics as a function of the resisting force, control means for changing the load on the motor by a brake thereon, and/or control means for applying a corrective motor load with the change in corrective motor load being approximately proportional to the change in the resisting force exerted by the resisting load, and more particularly with this change being approximately inversely proportional during movement in the load raising direction and approximately directly proportional during movement in the lowering direction in a motor-driven hoist construction.

A further object of the present invention is to provide better speed control for a speed controller operated wound rotor A.C. motor.

A further object of the present invention is to provide a motor control means having an eddy current brake driven by the motor and having its braking force a function of the resisting force applied by the resisting load to the motor.

A further object of the present invention is to provide a motor control characterized by its structural simplicity, its desirable operating characteristics, and its inexpensive manufacturing cost.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 4 is a side elevational view of another form of power adjusting means responsive to the load that may be substituted for the one shown at the lower left in Fig. 1; while

Before the hoist motor control here illustrated is specifically described, it is to be understood that the invention here involved is not limited to the structural details or arrangement of parts here shown since a motor control embodying the present invention may take various forms. It also is to be understood that the phraseology or terminology herein employed is for purposes of description and not of limitation and the scope of the present invention is denoted by the appended claims.

While this invention might be adapted to various uses, it has been chosen to show the same as applied to a motor-driven hoist and is primarily concerned with obtaining better speed control for a speed controller actuated wound rotor type A.C. motor although it is usuable with any type motor.

Figure 1:
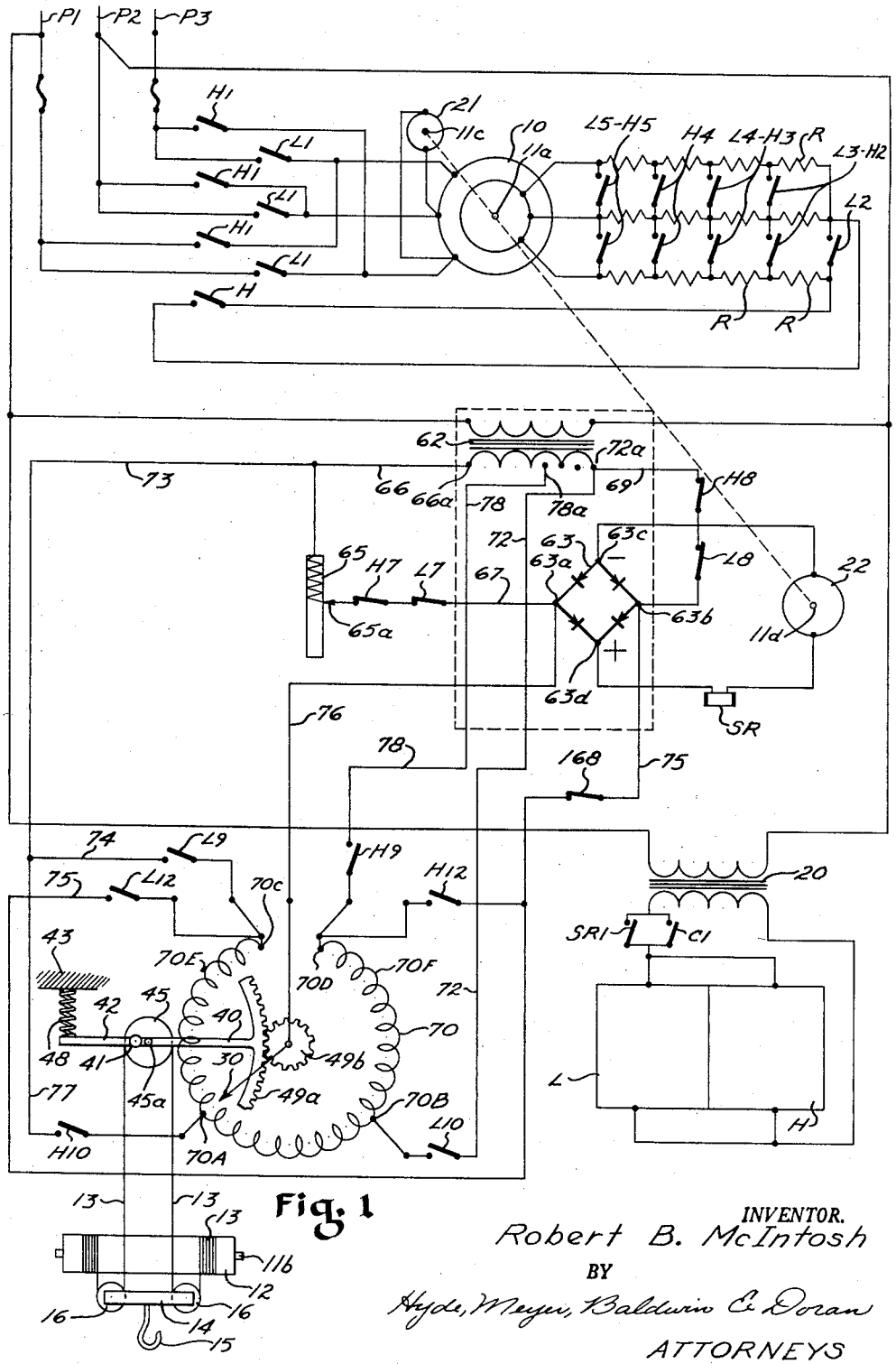
Fig. 1 is an electrical diagram of one form of the invention used in a motor-driven hoist.

In Fig. 1, three-phase electrical power is supplied from lines P1, P2 and P3 in the upper left-hand corner to drive and control motor 10. This motor has its shaft 11a operatively connected for driving shaft 11b, either directly or through suitable gearing, of the hoist drum 12 at the lower left for raising or lowering the resisting load in opposite directions, depending on the direction of rotation of the motor 10, by a cable 13 having its opposite ends secured to and wound around the cable drum 12 and adapted to carry a load on hook block 14 having hook 15 and sheaves 16. The upper end of the center bight of cable 13 is passed over a sheave 45 above the drum 12, which sheave is generally fixed against substantial vertical movement.

Motor 10 in Fig. 1 may be provided with any suitable type of reversing and step-type speed controller, such as the one illustrated having a plurality of different steps with each step providing a different speed by changing the resistance in the motor rotor. Any suitable manual or magnetic controllers may be used with the one disclosed herein being specifically the conventional type of magnetic controller comprising hoisting controller H and lowering controller L receiving power through transformer 20 with the hoisting relay closing hoisting relay contacts H followed by a numeral and lowering controller L closing lowering relay contacts L followed by a numeral; all contacts being shown in their normal position in the drawings with relay coils deenergized. The contacts are closed in step sequence consecutively as these suffix numerals progress from 1 to 5 to provide five different speeds in each direction with the lower numbered and previously closed relay contacts remaining closed until the controller is returned back toward the "off" position. The stator coils of motor 10 are energized for hoisting by closing relay contacts H1 and for lowering by closing relay contacts L1 so as to interchange two of the leads for causing motor reversing in the conventional manner. The controllers provide five speeds in each direction by closing the relay contacts L1, L2, L3, L4 and L5 or H1, H2, H3, H4, and H5 in that numerical order, so as to cut out more and more resistance in the rotor circuit formed by resistance elements R.

A conventional holding brake 21 can also be supplied with its shaft 11c operatively connected with shaft 11a of the motor 10.

The wound rotor A.C. motor used with this type reversing and speed controller but without the present invention has speed variation upon application of motor load variation so as to provide certain inherent disadvantages when driving a load hoist. When the motor is subjected to an overhauling load, some means must be used to prevent the motor from overspeeding when it is operating in the lowering direction with resistance in its rotor circuit. Use of a mechanical load brake leaves much to be desired because it requires a considerable amount of maintenance. Also, at each speed controller step, a heavier load will decrease the speed during raising and increase the speed during lowering so as to provide poor speed regulation upon load variation. Also, there is always the danger that a heavy load may fall at a dangerous speed.

This invention solves these problems and many others in a motor driven hoist. Here, suitable motor control means, responsive to the movement resisting force exerted on motor 10 by the resisting load on hook 15, is provided for maintaining the speed of movement of the resisting load on hook 15 approximately constant at any given speed controller step irrespective of the weight of this load, or it may be used for changing the motor operating characteristics in any other manner as a function of the resisting force exerted by the load. Here, corrective motor load is applied to motor 10 by an eddy current brake 22 having its shaft 11d operatively connected to shaft 11a of the motor for driving thereby. This brake is controlled by a load sensing power adjusting means, provided at the upper end of cable 13 in the lower left-hand corner of Fig. 1, responsive to a motion caused by the force exerted by the load on hook 15 with this force resisted by a suitable spring. This motion is made to drive the arm of a contactor 30, 31a and 31b or 32 along a resistance coil (or potentiometer) 80 and 81 or 90 or along an autotransformer coil 70 with the coil forming one part of the power unit providing adjustable output for varying the braking effect produced by eddy current brake 22.

Eddy current brake 22 has the energy it produces dissipated within itself in the form of heat. The rotor thereof, driven by shaft 11d, is surrounded by a stator coil energized by direct current to produce the braking effect, as is usual in eddy current brakes. At any given speed, the torque required to drive it, and thus its braking torque, is a function of the excitation of the stator coil by the direct current amperage applied thereto until flux saturation is approached. The higher the amperage, the higher the braking. Although any type brake may be satisfactory if its braking force is a suitable function of the power applied thereto, the eddy current brake is preferred, especially over a mechanical brake, which has a higher maintenance cost.

Figure 5:
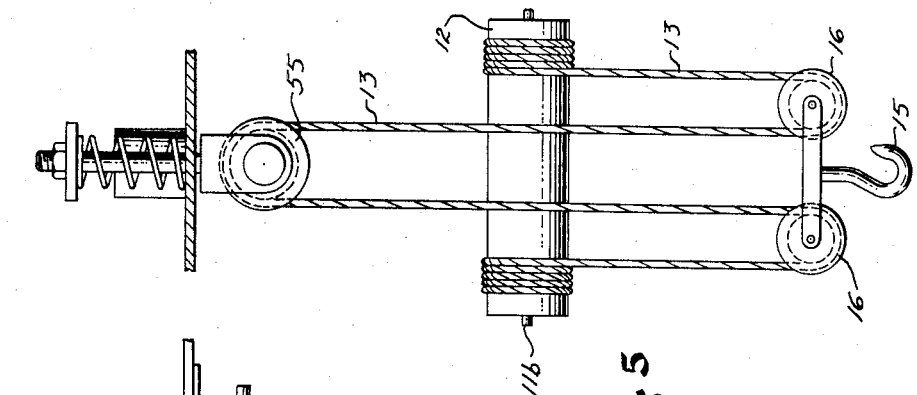
Fig. 5 is a side view taken along the line 5—5 of the construction in Fig. 4.
Figure 4:
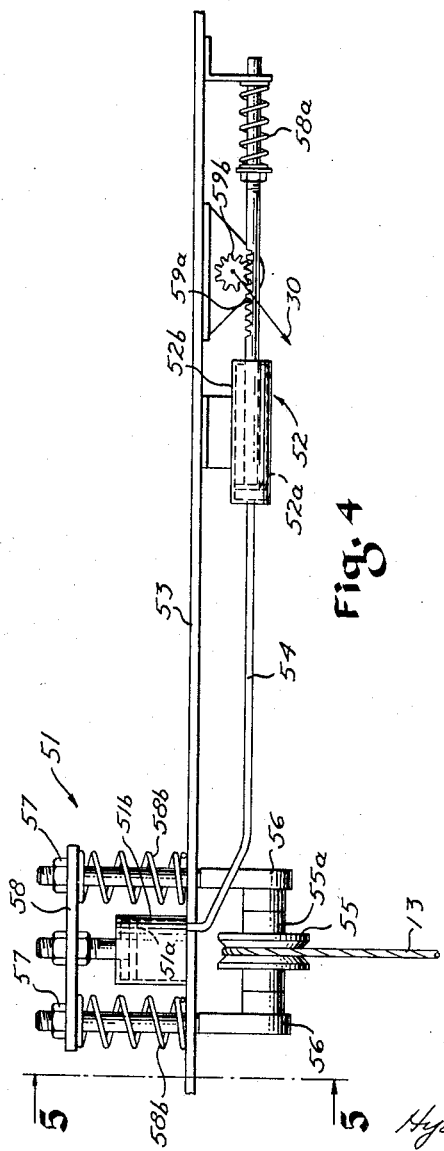

Two different types of power unit adjusting means, responsive to the load, are disclosed, one at the lower left in Fig. 1 and the other in Figs. 4 and 5. Each power unit adjusting means varies the output of its associated power unit by moving a contactor, such as contactor 30, along the length of its associated coil. The adjusting means comprises a load sensing device operatively connected with the hoist drum 12 and cable 13 for providing a movement varying with the weight of the load and an operative connection between this device and the contactor 30.

The structure operatively connecting the weight sensing device, the power source and eddy current brake 22 may be described as a "transducer" responsive to the movement of said device for modifying the output from said source for changing the motor operating characteristics by varying the energization of brake 22 in relation to the movement of the load sensing device. "Transducer" means any device for translating the varying reaction of the load sensing device (to varying loads) into a varying electrical value by modification of output from a power source for use in the desired control function.

In both forms, a suitably mounted element is operatively connected to the resisting load for movement in one direction by the resisting force as the movably mounted element of the load sensing device. In Fig. 1 this takes the form of a lever 42 pivotally mounted by fulcrum or pivot 41 to frame or hoist trolley deck 43 fixed relative to the bearings for the ends of drum shaft 11b and operatively connected to the resisting load by an equalizer sheave 45 receiving a bight of the cable 13 and rotatably mounted on lever element 42 by shaft 45a. In Figs. 4 and 5, servomotor transmitter and receiver units 51 and 52 are rigidly connected to frame member or hoist trolley deck 53 rotatably supporting the bearings for hoist drum shaft 11b. The servomotor units are connected by a fluid passageway in conduit 54 with each unit including a piston element 51a or 52a and a cylinder element 51b or 52b with the piston elements being shown as movable and the cylinder elements as fixed. The conduit 54 and communicating chambers in units 51 and 52 are filled with an incompressible fluid. The movable element 51a of the transmitter is operatively connected to the resisting load for movement in the downward direction upon increase of the resisting force through equalizer sheave 55 rotatably secured to upstanding posts 56, 56 slidably mounted on frame 53, having adjusting nuts 57 at their upper ends, and connected by the connecting plate 58 to the stem of the piston element 51a.

Each form includes a resisting means biasing its associated element 42 or 51a in the opposite direction to resist the load. This takes the form of a spring 48 in Fig. 1 having one end backed against the frame 43 and the other end against lever element 42 and takes the form of springs 58a and 58b in Fig. 4, each having one end backed against the frame 53 and the other end against connecting plate 58, secured to piston element 51a or the rod of piston 52a. Spring 58a also keeps piston 52a against the fluid in cylinder 52b.

Driving means is provided in each form operatively connecting the movable element to the contactor, such as 30, of the power unit for causing movement thereof proportional to the movement of element 42 or 51a so as to cause power variation to brake 22 in response to the movement of the load sensing element. Rotation of lever element 42 about pivot 41 will swing the right distal end thereof in Fig. 1, while movement of piston element 51a in Fig. 4 will cause movement of piston element 52a by transmission of fluid through the closed system by conduit 54. In each form, a rack 49a (commonly called a quadrant) or 59a rotatably drives a pinion 49b or 59b having secured thereto an arm having at its distal end contactor 30. Hence, the position of contactor 30 is at all times in relation to the load on hook 15. In each form, increased load on hook 15 will cause the contactor arm to swing counterclockwise across its associated coil.

The power unit, having variable power output for energizing the coil of the eddy current brake 22 or otherwise changing the operating characteristics of motor 10, includes in each form a transformer 62 serving as an A.C. power source, a rectifier 63 having A.C. current applied at input terminals 63a and 63b thereof so as to have a D.C. output at terminals 63c and 63d to energize the stator coil of eddy current brake 22, and an off-point brake resistor coil 65 and contactor 65a for causing the eddy current brake 22 to exert sufficient force on the load on hook 15 in any given position when the speed controller L or H moves to the off position so as either to assist holding brake 21 in bringing the load to a standstill or to prevent lowering the load at an excessive speed should the brake 21 fail. In the off position of speed controller L or H, eddy current brake 22 is energized sufficiently to exert this desired force on the load in Figs. 1, 2, and 3 by alternating current supplied from the secondary of transformer 62 through line 66, off-point resistor coil 65, contactor 65a, normally closed contacts H7 and L7, and line 67 (including normally closed contact 68 in Figs. 2 and 3) to one side of the rectifier 63 at terminal 63a. Power is supplied from the secondary of transformer 62 through line 69 (including normally closed contacts H8 and L8 in Fig. 1) to the other rectifier terminal 63b. The amount of braking can be easily set to safely retard the lowering of any load within the capacity of the crane by adjusting the contactor 65a along the coil 65. Of course, when the load is being hoisted or lowered, energization of the relay coil in controller H or L will open contacts H7 and H8 or L7 and L8 respectively to break this circuit. Contacts H7 and L7, as well as all other H and L contacts having a higher numerical suffix and mentioned hereinafter, are simultaneously operated respectively with contacts H1 and L1 previously described.

Figure 2:
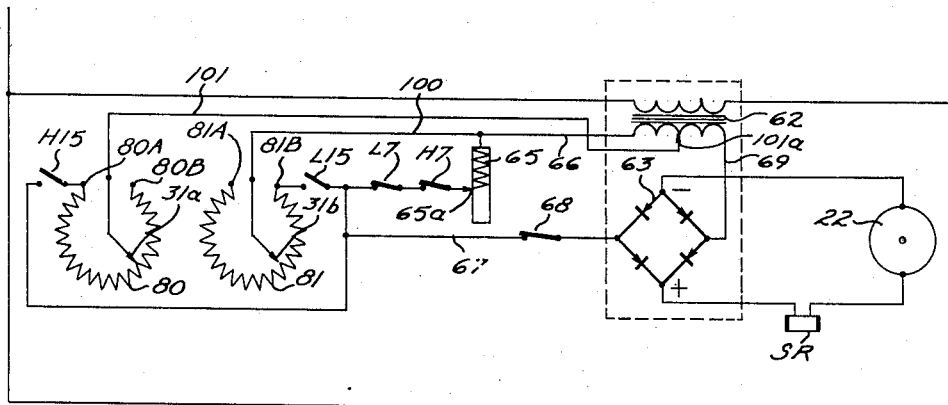
Fig. 2 is an electrical diagram including a motor power unit adapted to be substituted in Fig. 1.
Figure 2:
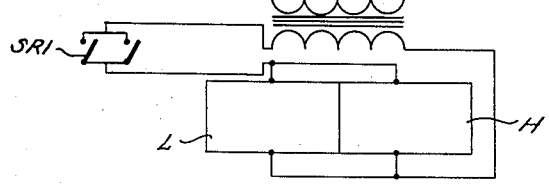
Figure 3:
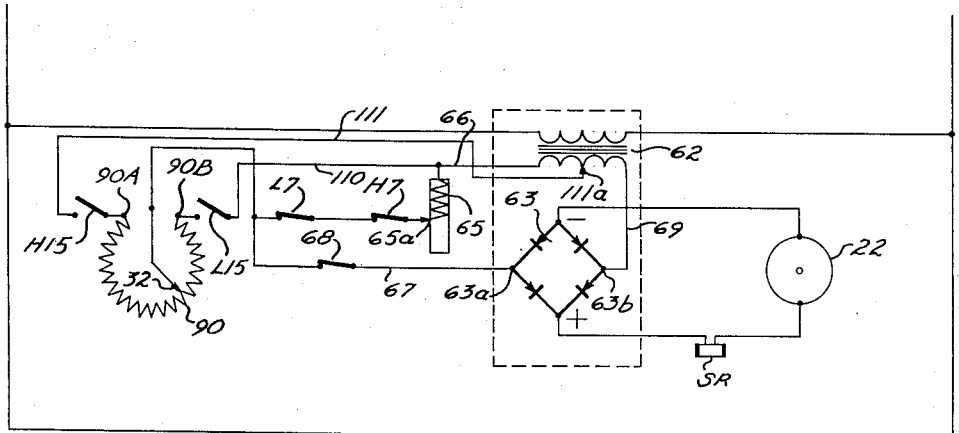
Fig. 3 is an electrical diagram similar to Fig. 2 except that the two components of the coil in Fig. 2 are combined in a single coil in Fig. 3.
Figure 3:
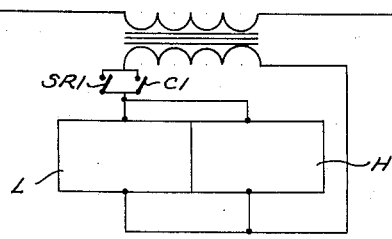

Each power unit has a different type of power coil construction therein; it being understood that any of the power units and coils may be used with either the load-sensing device of Fig. 1 or Fig. 4. Figs. 1, 2 and 3 have respectively an auto-transformer coil 70, a resistance coil formed of two components 80 and 81, and a single, continuous resistance coil 90.

Each coil includes a no-load terminal 70A, 80A and 81A, or 90A; and a full-load terminal 70B, 80B and 81B, or 90B. Coil 70 includes four additional terminals 70C, 70D, 70E and 70F. Since the arcuate distance between the no-load and full-load terminals in Figs. 2 and 3 differs from that in Fig. 1, either the diameter of the rack-driven pinion or the spring constant for the springs 48, 58a and 58b resisting the load must be different to permit the difference in sweep. Each of the coils has a variable power output section betweeen the no-load and full-load terminals A and B providing power output proportional to the location of contactor 30 along the length thereof with these terminals located at opposite ends thereof. In each, the brake receives its power through rectifier 63 during load raising from one end of this variable section and during load lowering from the other end of this variable section via its contactor and one of said terminals.

In Fig. 1, the autotransformer coil 70 supplies power to eddy current brake 22 dependent upon the location of contactor 30. During load lowering, the coil is energized between terminals 70B and 70C at the full voltage of the secondary of the transformer 62 respectively through line 72 and now closed but normally open lowering contact L10, and through lines 66, 73 and 74 and normally open contact L9 now closed during the lowering operation. The power applied to rectifier 63 is determined by the voltage between contactor 30 and terminal 70C of the autotransformer coil with paths leading respectively through lines 75 and now closed but normally open lowering contact L12 to rectifier terminal 63b, and through contactor 30 and line 76 to rectifier terminal 63a. During hoisting or raising a load, the autotransformer receives less than the full secondary voltage of transformer 62 between contacts 70A and 70D through lines 66, 73 and 77 and normally open hoisting contact H10 now closed to terminal 70A, and from transformer tap 78a through line 78 and now closed hoisting contact H9 to terminal 70D. The power applied to rectifier 63 is determined by the voltage between contactor 30 and terminal 70D of the autotransformer coil with paths leading respectively through line 76 to rectifier terminal 63a, and through normally open hoisting contact H12 now closed and line 75 to rectifier terminal 63b.

Now it can be readily seen that the terminals divide the coil 70 into three sections—namely, the variable power output middle section between terminals 70A and 70B and two fixed power output end sections straddling the middle section and connected thereto and formed between terminals 70A—70C and 70B—70D. Of these terminals, alternate terminals 70A and 70D along the length of the coil are connected to the power transformer 62 during raising and the remaining terminals 70B and 70C are connected to the transformer 62 during lowering for energizing the autotransformer coil 70. In both raising and lowering, the contactor 30 and the end terminal 70D or 70C of the end section connected to the power source 62 are connected to the rectifier 63. Hence, the brake 22 and rectifier 63 receive the summation of power from one of the end fixed sections and from one end of the variable section to the contactor 30 during load raising by motor drive in one direction and receive the summation of power from the other fixed section and from the other end of the variable section to the contactor 30 during load lowering by motor drive in the opposite direction.

In operation, if there were no load whatever on the hook 15 during lowering, contactor 30 would be at terminal 70A so as to furnish to the rectifier the voltage between terminals 70A—70C as the proportionate part of the total voltage between terminals 70B—70C furnished by the transformer 62. With heavier loads, contactor 30 will move farther counterclockwise away from terminal 70C to increase the voltage applied to rectifier 63 and thus increase the braking effect. When an overload is applied to hook 15, contactor 30 will move counterclockwise past terminal 70B into the right-hand end section in Fig. 1 to cause the autotransformer to apply to rectifier 63 a higher voltage than the output of transformer secondary 62 to overexcite the brake 22 and thus increase the braking power. When the load is being raised, contactor 30 will be in the Fig. 1 position if no load is on the hook. Less than full power and less than full voltage output of transformer 62 will be applied to the rectifier 63 since the voltage of transformer 62 between taps 66a and 78a is applied to the autotransformer coil 70 between terminals 70A—70D and the power applied to the rectifier 63 is between contactor 30 and terminal 70D. If an increased load is applied to hook 15, contactor 30 will swing counterclockwise and thus decrease the voltage applied to the rectifier 63 and also decrease the braking effect of brake 22.

Since different hoists may have different operating characteristics and since different conditions may be encountered during load raising than during load lowering, it may be desirable to make changes in the circuit to compensate for differences in the mode of operation in the hoist, such as the frictional values in different machines, the direction of movement of the load up or down, unusual eddy current brake characteristics, and many other complex factors. Either one of two hereinafter described different constructions or both of these two constructions may be used. First, since the voltage of autotransformer end sections 70A—70C and 70B—70D add to the variable power taken off the center section by contactor 30, it may be desirable to change the length, and hence the voltage, of one or both end sections. For example, one of the lines connected to the coil at terminal 70C may be moved to terminal 70E located any place between terminals 70A and 70C. A similar variation in construction could be performed with the right-end half of autotransformer coil 70 with respect to terminal 70F. Terminals 70C and 70E are in one end section and terminals 70D and 70F are in the other end section. Second, since greater braking is required during load lowering than during load raising, different outputs or voltages from transformer 62, serving as the power source, may be used. During load lowering, the full secondary voltage between taps 66a and 72a is used; and during load raising, a lower secondary voltage between taps 66a and 78a may be used. Of course, this voltage during load raising may be less than or equal to the full secondary voltage used during load lowering depending upon the distance between taps 72a and 78a.

Figs. 2 and 3 disclose resistance coils with the coil in Fig. 2 made up of two components 80, 81 having two contactor components 31a, 31b driven by a common rack (49a or 59a) while the one in Fig. 3 is a single coil 90. In each, the transformer 62 has in series therewith, to reduce the input power to rectifier 63 during lowering, the resistance coil portion between contactor 31b and terminal 81B, or between contactor 32 and terminal 90B; or during raising between contactor 31a and terminal 80A, or between contactor 32 and terminal 90A. During lowering or raising, controller relay contact L15 or H15 is closed to complete the proper series circuit. Hence, the coil components 80 and 81 are merely arranged in parallel with opposite ends of each being used, depending upon the direction of load movement, while both ends of coil 90 in Fig. 3 are used, Hence, each provides a variable power output section between terminals 80A—80B, 81A—81B, or 90A—90B with its output proportional to the location of the contactor along the length thereof.

The desired full voltage during load lowering and the desired adjustable lower voltage during load raising is also obtained. Figs. 2 and 3 have respectively lines 100 and 110 extending from line 66 to provide full voltage from one end of the transformer 62 to contactor component 31b and terminal 90B used during load lowering. Figs. 2 and 3 also have lines 101 and 111 from adjustable transformer taps 101a and 111a to provide a lower and adjustable voltage to contactor component 31a and terminal 90A during load raising.

In operation during lowering with no load on hook 15, the full length of the resistance between contactor 31b and terminal 81B or between contactor 32 and terminal 90B is in series with the rectifier 63 since the contactor is located at terminal 81A or 90A respectively. This provides minimum braking effect. If the load is heavier, the contactor swings counterclockwise to reduce the resistance and thus increase the power to rectifier 63 to increase the braking. During raising with no load on hook 15, contactor 31a is at terminal 80A or contactor 32 at terminal 90A to provide minimum resistance and maximum braking power. If the load is heavier, the resistance is increased and the braking power is decreased.

It should be noted that in Figs. 1 and 3, the common coil 70 or 90 provides for both load lowering and load hoisting variations with opposite ends being respectively used.

All forms of this invention have generic advantages over the conventional wound rotor, A.C. motor for a hoist with the speed control obtained by the conventional controller. First, there is no sacrifice in safety. The hoist cannot start unless the eddy current brake 22 is energized. Energization of brake 22 also energizes starting relay coil SR to close contact SR1 to energize controllers L and H; after motor 10 has reached the speed with contact L4 or H3 closed, contact C1 closes simultaneously with contact L4 or H3 to maintain the circuit if contact SR1 opens. Also, in the controller off position the eddy current brake 22 may be excited through resistance coil 65 to help the electric holding brake 21 to stop the load or to prevent lowering of the load at an excessive speed if brake 21 should fail.

Second, relatively flat speed-load curves are obtained for all speed points of controller L and H. Also, these curves are more nearly flat at higher speeds where this feature is most welcome. At any controller speed point, brake 22 plus the load on hook 15 exerts approximately the same torque on motor 10 regardless of the size of the load, with this torque summation being different at different speed controller points to provide different load moving speeds. For example, the motor may be fully loaded at each hoisting speed point regardless of the load on the hook. These desirable characteristics are obtained by having the change in the corrective motor load exerted by brake 22 approximately inversely proportional to the change in the resisting force exerted by the resisting load on hook 15 during movement in the load raising direction and approximately directly proportional to the change in the resisting force exerted by the resisting load on hook 15 during movement in the load lowering direction. Hence, during load lowering, the braking increases with an increase in load, and during load raising the braking increases with a decrease in load. Hence, the braking force varies approximately proportionately with the weight of the load to correct the undesirable operating characteristics of the A.C. motor. This load sensing control of the brake is much more desirable than cutting in or out of fixed steps of resistance at the controller contacts to control the eddy current brake excitation; this type of construction is not capable of exerting a variable braking torque on each speed point in proportion to the load on the hook so as to correct the basic defect in the wound rotor A.C. motor of having speed variation upon torque or moving load weight variation.

Third, eddy current brake excitation is economical since never more than the load required is applied to the motor 10. This saves power and heating on light load lowering and heavy load hoisting or raising.

The eddy current brake 22 may be used in movement of the load in both the raising and lowering direction or in only one direction, whichever is desired. Use in the lowering direction is probably the most important since it will prevent the motor from being overspeeded by an overhauling load. However, use in the raising or hoisting direction is also desirable as it gives better speed regulation at low speeds, provides slower raising speeds, stabilizes handling of a light load, and maintains the speed closer to constant for any step of the controller with any load on the hook, if movement is in the raising, lowering or both directions.

The circuit may be adjusted to allow for different operating conditions, such as differences in friction, direction of load movement, eddy current braking characteristics, and other operating conditions encountered in different setups. All illustrated forms of the invention permit using from the secondary of transformer 62 a lower voltage during raising than during lowering.

The autotransformer set up in Fig. 1 is the preferred one since it has advantages that the other forms, as illustrated, do not have. However, the other forms in Figs. 2 and 3 may be modified to include one or more of these. First, overexcitation of the eddy current brake 22 in Fig. 1 is permitted when overloads are on the hook 15 to thus extend the range of the brake. As the contactor 30 moves counterclockwise past the terminal 70B toward terminal 70D, overexcitation of the brake will result since more power is applied thereto in the lowering direction while underexcitation will occur during raising of an overload. This will make it possible to use a smaller eddy current brake 22 in some instances. Second, circuit adjustment to allow for different operating conditions may be made not only by the difference in voltage, mentioned in the preceding paragraph, but also by altering the fixed end section 70A—70C or 70B—70D, such as by changing the length thereof or by changing the tap of one or more of the end lines thereto by using terminals 70E and 70F to vary the fixed power applied to rectifier 63.

Also, it may be desirable to vary the uniformity of the thickness of the winding in the Figs. 2 and 3 installations or the spacing between the coil loops in the Fig. 1 installation so that equal arcuate movement of the pointer along each coil will give a slightly different proportionate output to rectifier 63 to provide finer adjustment and to even out any rough spots in the approximately flat speed load curve.

An auxiliary permanent magnet generator may be added, if desired, to keep the eddy current brake 22 energized after power failure to prevent the load from dropping at a dangerous speed should the holding brake 21 fail simultaneously.

Various changes in details and arrangement of parts can be made by one skilled in the art without departing from either the spirit of this invention or the scope of the appended claims.

What I claim is:

1. In a motor driven drive for moving a resisting load, a motor, and motor control means responsive to the movement resisting force exerted on said motor by said resisting load for changing the motor operating characteristics as a function of said resisting force by applying a corrective motor load to said motor; said motor control means including an eddy current brake for said motor, a power unit having variable power output for energizing said eddy current brake, said power unit including a coil providing variable power output to said brake proportional to the location of a contactor along the length thereof, and means for varying the output of said power unit by moving said conductor along the length thereof responsive to the change in resisting force with the change in power output being approximately proportional to the length of contactor movement.

2. In the combination set forth in claim 1, wherein said power unit includes a power source having two different outputs, and means operatively connecting one output to said coil during resisting load movement in one direction and the other output to said coil during resisting load movement in an opposite direction.

3. In a motor driven drive for moving a resisting load, a motor, and motor control means responsive to the movement resisting force exerted on said motor by said resisting load for changing the motor operating characteristics as a function of said resisting force by applying a corrective motor load to said motor; said motor control means including a brake for said motor, a power source for energizing the brake, a load sensing device providing movement varying with the weight of the resisting load, and a transducer responsive to movement of said device for modifying the output from said source for changing the motor operating characteristics.

4. In a motor driven drive for moving a resisting load a motor, and motor control means responsive to the movement resisting force exerted on said motor by said resisting load for changing the motor operating characteristics as a function of said resisting force by applying a corrective motor load to said motor; said load sensing device including a movably mounted element operatively connected to the resisting load for movement in one direction by the resisting force, resilient means biasing said element in the other direction, and means operatively connecting said movable element to said transducer for causing power variation in response to movement of said element.

5. In a motor driven drive for moving a resisting load, a motor, and motor control means responsive to the movement resisting force exerted on said motor by said resisting load for changing the motor operating characteristics as a function of said resisting force by applying a corrective motor load to said motor; said motor control means including a brake for said motor, a power unit having variable power output for energizing the brake for changing the motor operating characteristics, said power unit including a coil providing variable power output proportional to the location of a contactor along the length thereof, and adjusting means for varying the output of said power unit by moving said contactor along the length thereof responsive to the change in resisting force, said adjusting means including a pivotally mounted lever element operatively connected to the resisting load for rotation in one direction by the resisting force, resilient means biasing said lever element in the other direction, and driving means operatively connecting said lever element to the contactor of said power unit for causing power variation in response to movement of said lever element.

6. In a motor driven drive for moving a resisting load, a motor, and motor control means responsive to the movement resisting force exerted on said motor by said resisting load for changing the motor operating characteristics as a function of said resisting force by applying a corrective motor load to said motor; said motor control means including a brake for said motor, a power unit having variable power output for energizing the brake for changing the motor operating characteristics, said power unit including a coil providing variable power output proportional to the location of a contactor along the length thereof, and adjusting means for varying the output of said power unit by moving said contactor along the length thereof responsive to the change in resisting force, said adjusting means including servomotor transmitter and receiver units connected by a fluid passageway, each servomotor unit including a piston element and cylinder element with one movable and the other fixed, the movable element of said transmitter being operatively connected to the resisting load for movement in one direction by the resisting force, resilient means biasing said last mentioned element in the other direction, and driving means operatively connecting said movable element of said receiver to the contactor of said power unit for causing power variation in response to movement of said last mentioned element.

7. In a motor driven drive for moving a resisting load, a motor, motor control means responsive to the movement resisting force exerted on said motor by said resisting load for changing the motor operating characteristics as a function of said resisting force, said motor control means including a power unit providing variable power output for changing the motor operating characteristics, said power unit having a plurality of sections including a variable power output section with a coil providing power output proportional to the location of a contactor along the length thereof, including a first fixed power output section, including a second fixed power output section, means for varying the motor opearting characteristics by the summation of power from one fixed section and from one end of said variable section to said contactor during motor drive in one direction and by the summation of power from the other fixed section and from the other end of said variable section to said contactor during motor drive in the other direction, and means for varying the output of said power unit by moving said contactor along the length of the variable section between opposite ends thereof responsive to the change in resisting force with the change in power output being approximately proportional to the length of contactor movement.

8. In a motor driven hoist for raising or lowering a resisting load in opposite directions, a motor having speed variaiton upon application of motor load variation, a cable drum operatively connected with said motor to be driven thereby, a cable wound on said drum and adapted to carry said resisting load, motor control means responsive to the movement resisting force exerted on said motor by said resisting load for maintaining the speed of movement of said resisting load approximately constant irrespective of the resisting force by applying a corrective motor load to said motor with the change in said corrective motor load being approximately inversely proportional to the change in the resisting force exerted by said resisting load during movement in the load raising direction or approximately directly proportional to the change in the resisting force exerted by the resisting load during movement in the load lowering direction; said motor control means including a brake for said motor, a power unit having variable power output for energizing the brake, said power unit including a power source, including a coil with a section connected to said source for providing variable power output and having terminals spaced along the length thereof, means operatively connecting to said brake and to said source said contactor and said terminals so that said brake receives the power from one end of said variable section to said contactor during raising and from the other end of said variable section to said contactor during lowering, and adjusting means for varying the output of said power unit by moving said contactor along the length of the section between terminals thereof corresponding to no-load and full-load responsive to the change in resisting force with the change in power output being approximately proportional to the length of contactor movement, said adjusting means comprising a load sensing device operatively connected with said drum and cable and with said contactor and providing a movement varying with the weight of said load to said contactor for varying the energization of said brake in relation to the movement of said device.

9. In the combination set forth in claim 8, wherein said power source has two different outputs, and wherein said power unit includes means operatively connecting one output to said coil during resisting load movement in one direction and the other output to said coil during resisting load movement in the other direction.

10. In the combination set forth in claim 8, wherein said coil has said aforesaid section as a variable power output middle section having power output proportional to the location of said contactor along the length thereof, has a first fixed power output end section, has a second fixed power output end section with said end sections straddling said middle section and connected thereto, and has four terminals respectively located at the opposite ends of said middle section and in said end sections, said power unit includes means connecting alternate terminals along the length of said coil to the power source during raising, and connecting the remaining terminals to the power source during lowering for supplying power to said coil, means operatively connecting to said brake said contactor and during load lowering a terminal in one of said end sections and during load raising a terminal in the other of said end sections so that said brake receives the summation of power from at least a portion of one of said fixed end sections and from one end of said variable section to said contactor during raising, and receives the summation of power from at least a portion of the other of said fixed end sections and from the other end of said variable section to said contactor during lowering.

11. In the combination set forth in claim 8, wherein said coil has said aforesaid section as a variable power output middle section having power output proportional to the location of said contactor along the length therof, has a first fixed power output end section, has a second fixed power output end section with said end sections straddling said middle section and connected thereto, and has four terminals with one located at the opposite ends of each section, said power unit includes means connecting alternate terminals along the length of said coil to the power source during raising, and connecting the remaining terminals to the power source during lowering for supplying power to said coil, means operatively connecting to said brake said contactor and the end terminal of the end section connected to said power source so that said brake receives the summation of power from one of said fixed sections and from one end of said variable secion to said contactor during raising, and receives the summation of power from the other of said fixed sections and from the other end of said variable section to said contactor during lowering, said contactor is able to move past a common terminal between sections and into at least one end section.

12. In the combniation set forth in claim 8, wherein said brake is an eddy current brake having an energizing coil with said power unit energizing the coil of said eddy current brake for changing the motor operating characteristics, said motor is a wound rotor A.C. motor having speed variation upon application of motor load variation, a speed controller for said motor having a plurality of different steps with each step providing a different speed by changing the resistance in said rotor, said motor control means maintaining the speed of movement of said resisting load approximately constant at any given speed step irrespective of the resisting force, said adjusting means includes a movably mounted element operatively connected to the resisting load for movement in one direction by the resisting force, resilient means biasing said element in the other direciton, and driving means operatively connecting said movable element to the contactor of said power unit for causing power variation in response to movement of said element.

13. In the combination set forth in claim 8, wherein said coil is an autotransformer coil.

14. In the combination set forth in claim 8, wherein said coil is a resistance coil.

15. In the combination set forth in claim 14, wherein said coil comprises two coil components.

16. In the combination set forth in claim 8, wherein said coil consists of a single continuous resistance coil.

17. In a motor driven hoist, means for maintaining approximately constant the speed of a reversible motor coupled to a load for raising and lowering said load comprising, means coupled to said motor for applying a braking torque to said motor and including means for controlling said braking torque in response to a variable input signal, means directly responsive to the resistance of said load to load movement for positioning a control element, and means responsive to the position of said element for providing said input signal.

18. A motor driven hoist as defined in claim 17 wherein the means coupled to said motor for applying a braking torque consists of an eddy current brake.

19. A motor driven hoist as defined in claim 18 wherein said means for providing a variable input signal includes a coil providing variable power output to said eddy current brake.

References Cited in the file of this patent

UNITED STATES PATENTS

| | | |
|---|---|---|
| 2,636,157 | Pell | Apr. 21, 1953 |
| 2,766,415 | Schurr | Oct. 9, 1956 |
| 2,774,923 | Wickerham | Dec. 18, 1956 |

UNITED STATES PATENT OFFICE
CERTIFICATE OF CORRECTION

Patent No. 2,924,766            February 9, 1960

Robert B. McIntosh

It is hereby certified that error appears in the printed specification of the above numbered patent requiring correction and that the said Letters Patent should read as corrected below.

Column 9, line 5, for "conductor" read -- contactor --.

Signed and sealed this 9th day of August 1960.

(SEAL)
Attest:

KARL H. AXLINE
Attesting Officer

ROBERT C. WATSON
Commissioner of Patents